United States Patent [19]
Domesle et al.

[11] Patent Number: 4,477,417
[45] Date of Patent: Oct. 16, 1984

[54] CATALYST FOR REDUCING THE IGNITION TEMPERATURE OF DIESEL SOOT

[75] Inventors: Rainer Domesle, Maintal; Herbert Völker, Hanau; Edgar Koberstein, Alzenau; Hans-Dieter Pletka, Freigericht, all of Fed. Rep. of Germany

[73] Assignee: Degussa Aktiengesellschaft, Frankfurt, Fed. Rep. of Germany

[21] Appl. No.: 542,313

[22] Filed: Oct. 14, 1983

Related U.S. Application Data

[62] Division of Ser. No. 434,806, Oct. 18, 1982.

[30] Foreign Application Priority Data

Oct. 21, 1981 [DE] Fed. Rep. of Germany ....... 3141713

[51] Int. Cl.³ ............................................. B01D 53/36
[52] U.S. Cl. .............................. 423/213.2; 423/215.5; 60/311
[58] Field of Search ............. 423/212 C, 213.2, 213.5, 423/213.7, 215.5; 60/297, 292, 311

[56] References Cited

U.S. PATENT DOCUMENTS

| 1,900,383 | 3/1933 | Jaeger | 423/535 |
| 2,881,214 | 4/1959 | Idol et al. | 502/347 |
| 4,303,552 | 12/1981 | Ernest et al. | 423/213.2 |
| 4,374,803 | 2/1983 | Fratzer et al. | 422/179 |
| 4,383,974 | 5/1983 | Fratzer et al. | 422/179 |
| 4,383,975 | 5/1983 | Fratzer et al. | 422/179 |
| 4,385,031 | 5/1983 | Fratzer et al. | 422/179 |
| 4,385,032 | 5/1983 | Fratzer et al. | 422/179 |

FOREIGN PATENT DOCUMENTS 2944841 11/1979 Fed. Rep. of Germany ...... 422/179
2951316 7/1981 Fed. Rep. of Germany .

Primary Examiner—Earl C. Thomas
Assistant Examiner—Jeffrey E. Russel
Attorney, Agent, or Firm—Beveridge, DeGrandi & Kline

[57] ABSTRACT

A process and catalyst is disclosed for the reduction of the ignition temperature of diesel soot filtered out of the exhaust fumes of diesel engines by passing the exhaust stream through a filter element. The filter element is a temperature resistant inert support onto which is deposited a catalytically effective amount of silver vanadate or a mixture of the temperature resistant carrier material and a catalytically effective amount of silver vanadate.

4 Claims, 5 Drawing Figures

CATALYST FOR REDUCING THE IGNITION TEMPERATURE OF DIESEL SOOT

This application is a division of Ser. No. 434,806, filed 10-18-82.

This invention relates to a catalyst for reducing the ignition temperature of diesel soot filtered out of the exhaust of diesel engines.

Diesel engines, as a result of their operating characteristics, emit carbon black particles or very fine condesate particles or a conglomerate of the two ("particulates") in addition to the toxic substances emitted by Otto engines, such as hydrocarbons, oxides of nitrogen, and carbon monoxide. These "particulates", hereinafter referred to simply as "diesel soot", are rich in condensed, polynuclear hydrocarbons, some of which have been recognized as carcinogenic.

It has already been suggested that the carbon black and condensate particles be collected in particulate traps or filters. However, since the temperatures of diesel exhaust gas under normal operating conditions are insufficient for burning off the accumulated soot—depending on the soot composition, which is dependent upon the engine, at least 450° to 600° C. are required for this—one must provide for a timely increase of the exhaust temperature in order to regenerate the trap or the filter, if accumulation of carbon black, and thus, a plugging is to be avoided. This can, for example, be accomplished by periodically enriching the air/fuel mixture formed in the motor, thereby producing a higher exhaust gas temperature. Another possibility provides for the design of a burner into the exhaust system ahead of the filter, which can be ignited on demand and which provides the temperatures necessary for burning the soot.

However, these solutions are associated with increased fuel consumption and, thus, partially reduce an important advantage of the diesel engine.

It has now been found that the ignition temperature of diesel soot can be reduced by equipping the particulate filter or trap with a special catalyst or with a temperature-resistance material containing the same, so that an appreciable reduction in fuel consumption during the regeneration of a filter can be achieved.

The object of the invention is a catalyst for reducing the ignition temperature of the diesel soot filtered out of the exhaust of diesel engines and is characterized in that its active ingredient is silver vanadate. Within the scope of the invention, all silver vanadates are usable.

Silver vanadate can be deposited onto a temperature-resistant carrier material or mixed with it. The usual substances, especially aluminum oxides of the transition series, are suitable as carrier materials. Other examples are silicon dioxide, titanium oxide, zirconium oxide, and oxides of the rare earth metals.

For the practical use of the diesel carbon black ignition-temperature reducing catalyst, silver vanadate or it in combination with a carrier material, is applied to a filter element serving as a reinforcing support. Known filter systems for diesel exhaust gas are suitable candidates as supports for the catalyst or for the system of materials containing it, those filter systems in which the inlet and outlet passages for the exhaust are arranged so that a minimum of pressure drop must be accepted for as great a filtration performance as possible.

A packing of temperature-resistant metal or mineral wool or a filter element in accordance with German Published Application No. 29 44 841 or according to German Published Application No. 29 51 316 can be used as a support. Particularly advantageous has been the use of a monolithic ceramic body containing multitudinous flow passages, whose openings in opposite faces are provided with sealing material, so that a flow passage open on one face is closed on the opposite face. Such a filter element also has the shape of a conventional monolithic honeycomb support for catalysts and may consist of α-aluminum or Cordierite. The flow passages have macroporous walls which are used as filtration surfaces. To accomplish this, a flow passage which is open on one face is closed on the opposite face. The sealing is effected by means of a ceramic plug joined to the material of the monolith by sintering or cemented by means of a fire-resistant cement. Thus, the exhaust is forced by obstructions to flow through the macroporous walls, and the diesel soot is held back.

Illustrative embodiments of the invention will now be described with reference to the accompanying drawing, in which:

FIGS. 1a and 1b are a top view and a cross-sectional view, respectively, of a diesel filter in the shape of a conventional monolithic honeycomb support for catalysts made of cordierite having flow passages with porous walls, said flow passages being closed with ceramic plugs on the upstream and the downstream side. These plugs are distributed in such fashion that in each case the closed end of a passage lies opposite to an open one;

EXAMPLE 1

(Preparation of silver mono vanadate)

234 grams (1 mol) of $NaVO_3 \cdot 4H_2O$ are dissolved in 1.5 liters of water in a beaker with heating; then, 178.5 grams (1.05 mol) of $AgNO_3$ in 250 ml water are added with stirring. Deep-orange colored silver mono vanadate is immediately precipitated. The precipitate is filtered by suction, washed twice with 1 liter of water, and subsequently dried at 80° in a drying oven.

EXAMPLE 2

(Coating the filter)

Figure 1A:
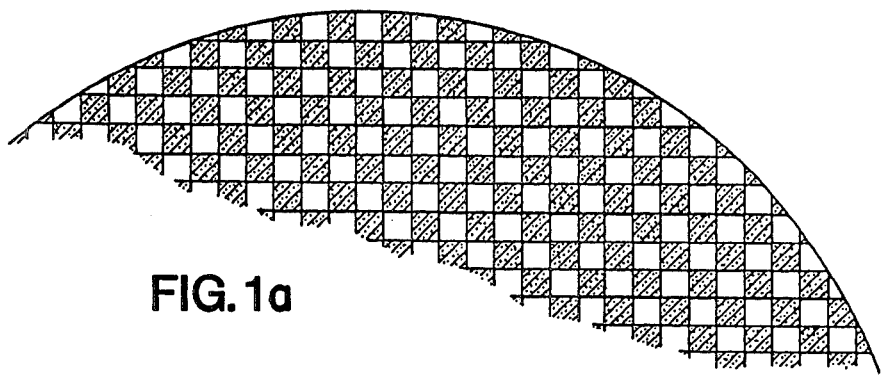
Figure 1B:
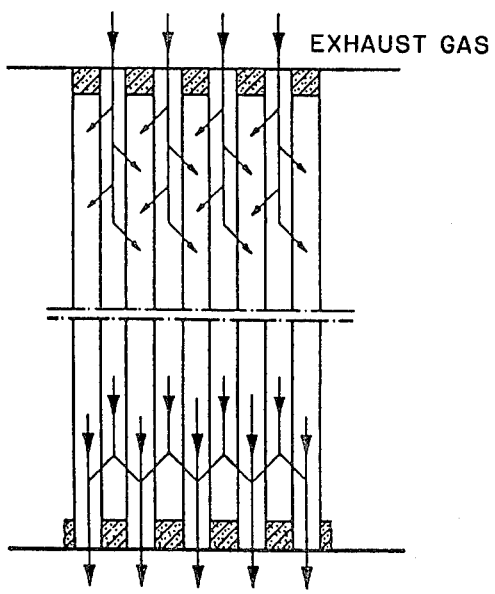

75 grams of the silver vanadate obtained according to Example 1 are dispersed in 250 ml water and ground for 15 hours in a ball mill and the resulting suspension is then diluted with water to 800 ml. A monolithic filter body made of Cordierite, as shown in FIG. 1, with a diameter of 11.85 cm, 15.25 cm long, having 15.5 cells per $cm^2$, is brought in contact with the diluted suspension, thereby depositing the silver vanadate onto the filter body. The excess suspension is then blown out and the catalyst-coated filter is dried for 3 hours at 300° C. The silver vanadate deposited in this case amounts to about 35 grams. When compared to an uncoated filter, the catalyst-coated filter has only a slightly increased back pressure.

| Back pressure measurements at constant conditions | | |
|---|---|---|
| Air Volume m$^3$/hr | Without Coating mm H$_2$O | Coated mm H$_2$O |
| 150 | 91 | 136 |
| 200 | 135 | 196 |

EXAMPLE 3

(Technical application test)

An activated filter, prepared in accordance with Example 2, was incorporated into the exhaust gas stream of a diesel engine and tested for its function of filtering out particulates and reducing the soot ignition temperature. The test parameters were as follows:

(a) Engine
  4-cylinder Diesel engine, fuel injection
  1.6 liters displacement
  40 kW output
(b) Collection phase
  Load: 72 N corresponding to about 400° C. before the filter
  RPM's: 2100 min$^{-1}$
  Oxygen content of the exhaust: 10 volume %
(c) Burnoff phase
  RPM's: 3000 min$^{-1}$
  Load: 75 N corresponding to 500° C. before the filter to 80 N corresponding to 570° C. before the filter
  Oxygen content of the exhaust: 5 volume %

Figure 3:
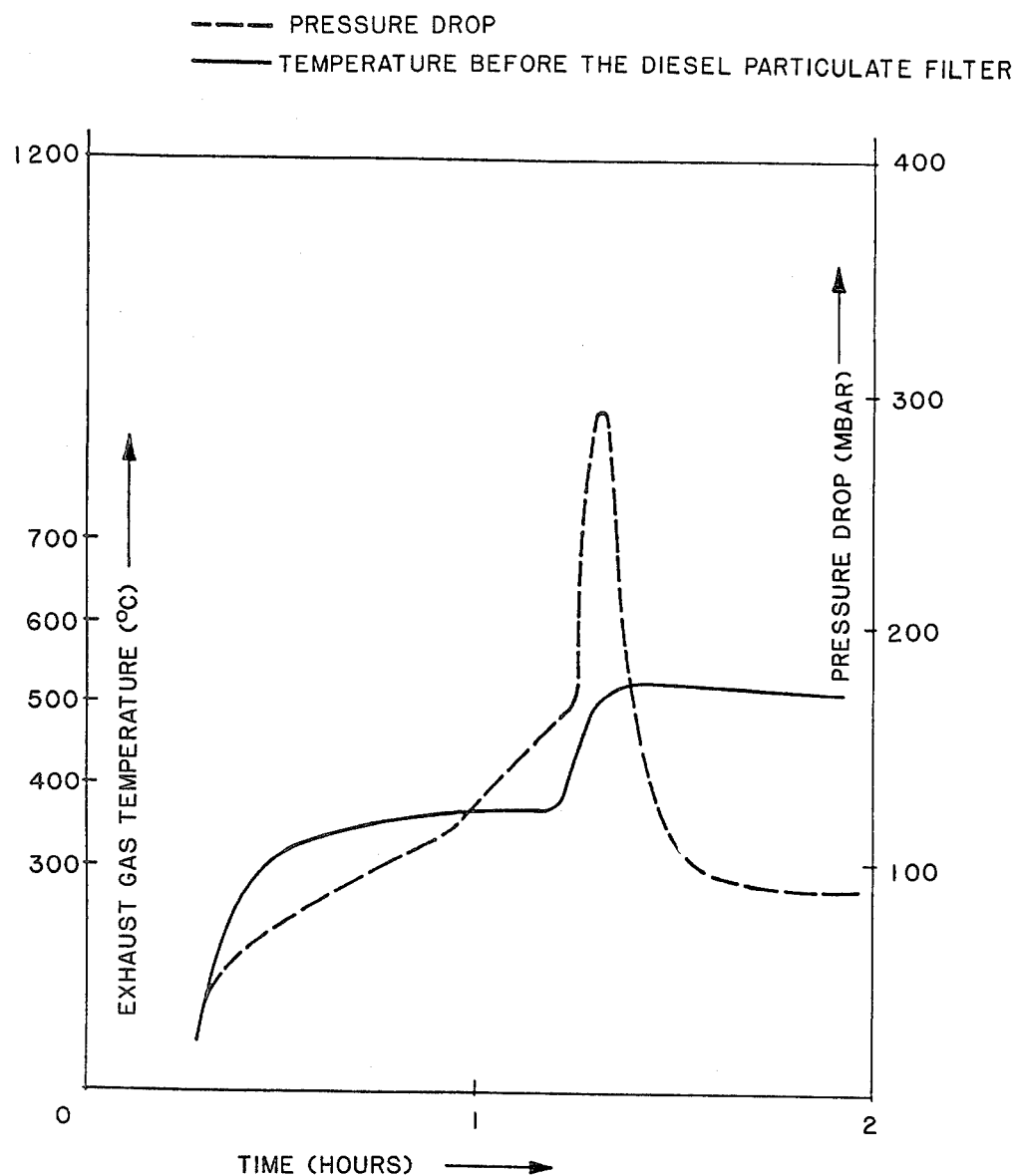
FIG. 3 is a plot showing the burnoff cycle with ignition temperature and pressure drop change versus operating time of a filter constructed as per FIG. 1 and activated in accordance with the invention.
Figure 4:
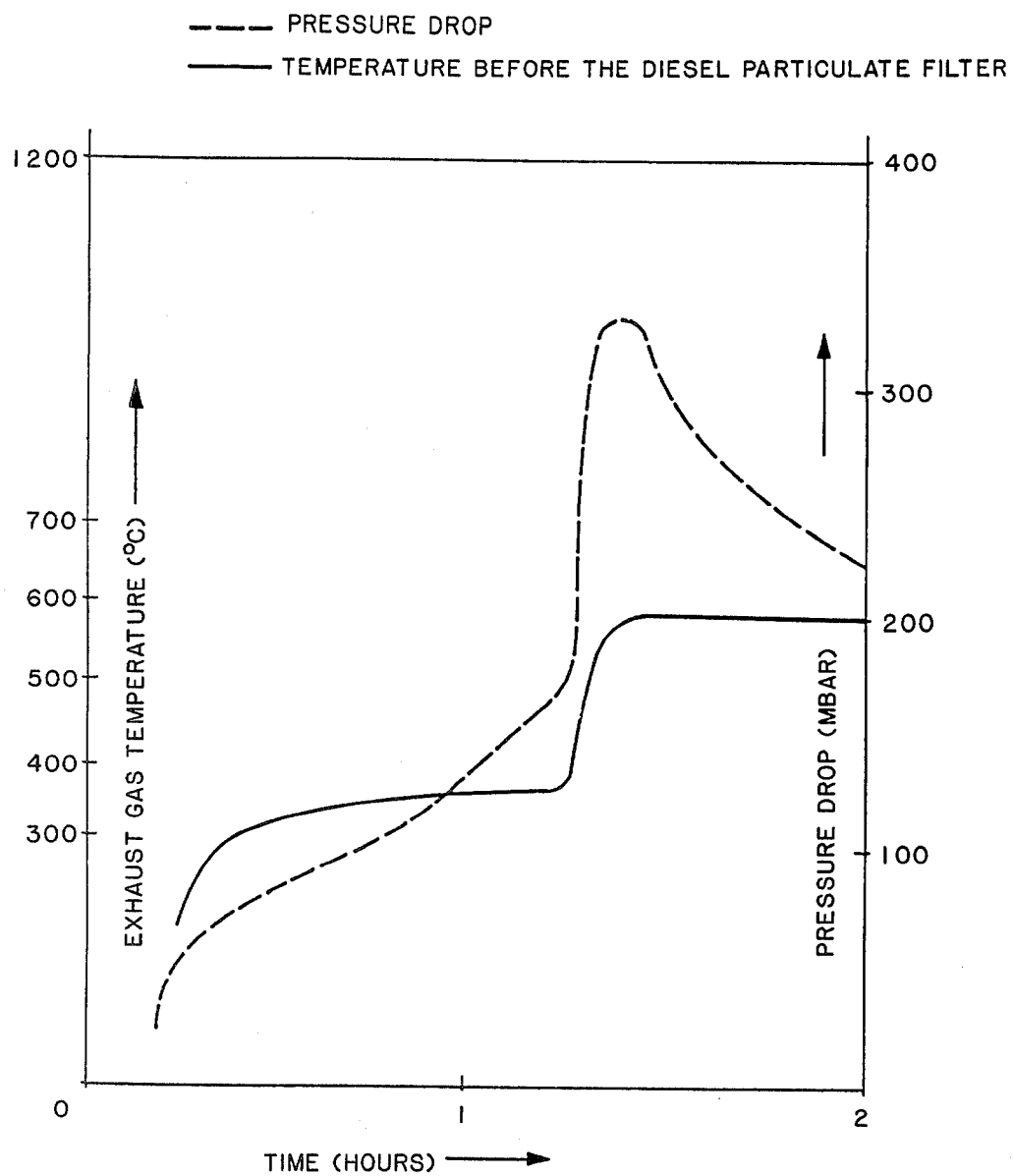
FIG. 4 is a plot showing the burnoff cycle with ignition temperature and pressure drop change versus operating time of a non-activated filter constructed according to FIG. 1.

During the carbon black loading phase (b), the filter was exposed to the exhaust gas stream until a pressure difference of 150 millibar across the filter was reached. For the next burnoff phase, the RPM was set at 3000 min$^{-1}$ and the load continuously increased, starting with 72 N. The pressure drop increased sharply to about 300 millibar as a result of the increased RMP's and temperature, until the accumulated soot ignited and the pressure drop decreased again. This type of cycle is shown in FIG. 3 for a filter activated in accordance with the invention, whereas FIG. 4 shows the same process for a non-activated filter.

Figure 2:
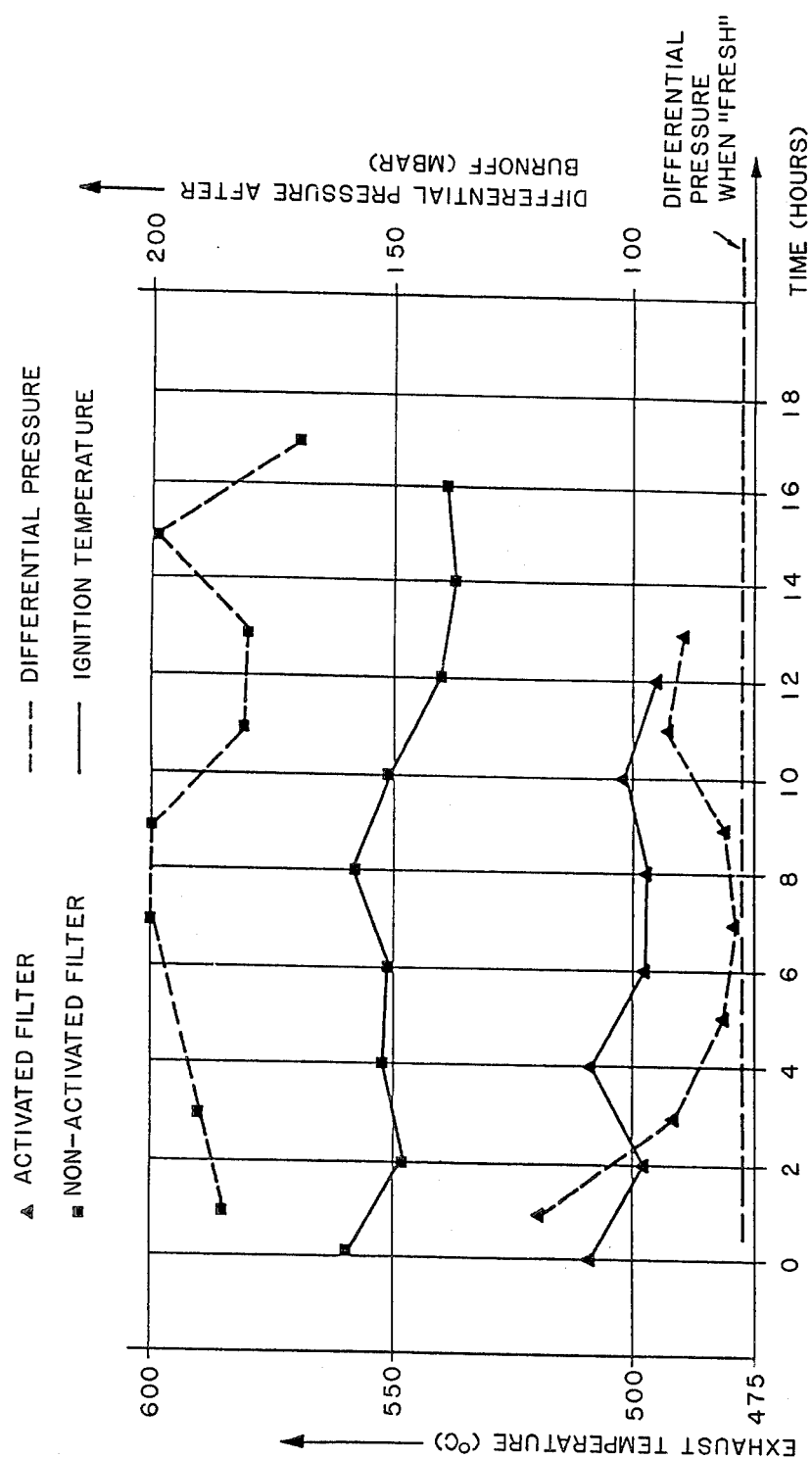
FIG. 2 is a plot showing the ignition temperature of diesel soot and the pressure drop remaining after burning off the soot for a diesel particulate filter catalytically activated in accordance with the invention, and of a non-activated filter, over several burnoff cycles, each started after one hour.

A comparison of the two figures proves the advantage of the filter coated in accordance with the invention with respect to soot burnoff temperature and the pressure drop remaining after the burnoff. While the pressure drop for the non-activated filter remained at about 200 millibar for an engine speed of 3000 min$^{-1}$ and a load of 80 Newton, the pressure drop for the filter activated in accordance with the invention dropped in a very short time (about 12 minutes) to a value below 100 millibar. Several accumulation- and burnoff cycles were run on the same filter to demonstrate the reliability of the individual measurements. The results are shown in FIG. 2 both for a filter activated in accordance with the invention, as well as for a non-activated filter. The activation according to the invention lowers the ignition temperature of diesel soot by at least 50° C. and at the same time causes a complete burnoff of the same. However, the non-activated filter decreases its back pressure only slowly and incompletely under the burnoff conditions employed. This means a decrease in the efficiency of the engine, and thus, an increased fuel usage. An increase of the burnoff temperature for complete soot burnoff from the non-activated filter would also lead to higher fuel consumption.

We claim:

1. A process for the reduction of the ignition temperature of diesel soot filtered out of the exhaust of diesel engines comprising passing the exhaust stream through a filter element, the filter element being a temperature-resistant inert support onto which is deposited a catalytically effective amount of silver vanadate or a mixture of a temperature resistant carrier material and a catalytically effective amount of silver vanadate.

2. The process as set forth in claim 1, wherein a temperature-resistant metal- or mineral wool packing or a steel screen filter element employed as support is used.

3. The process as set forth in claim 1, wherein as a support there is used a monolithic honeycomb ceramic body with a plurality of parallel flow passages whose openings in opposite faces are provided with sealing material, so that in each case a flow passage open on one face is closed on the opposite face.

4. The process as set forth in claim 1, wherein a catalytically active filter element is used which is arranged in the flow area of a housing provided with inlet and outlet passages for the exhaust.

* * * * *